(12) United States Patent
Yoon et al.

(10) Patent No.: US 12,113,222 B2
(45) Date of Patent: Oct. 8, 2024

(54) METHOD FOR PRODUCING CATHODE MATERIAL AND CATHODE INCLUDING CATHODE MATERIAL PRODUCED THEREBY

(71) Applicants: HYUNDAI MOTOR COMPANY, Seoul (KR); KIA CORPORATION, Seoul (KR)

(72) Inventors: Yong Sub Yoon, Seoul (KR); Hong Seok Min, Yongin-si (KR); Hajime Tsuchiya, Yokohama (JP); Yuki Sasaki, Yokohama (JP)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 204 days.

(21) Appl. No.: 17/477,904

(22) Filed: Sep. 17, 2021

(65) Prior Publication Data

US 2022/0109160 A1    Apr. 7, 2022

(30) Foreign Application Priority Data

Oct. 5, 2020 (KR) .................... 10-2020-0128223

(51) Int. Cl.
| | |
|---|---|
| *H01M 4/62* | (2006.01) |
| *H01M 4/131* | (2010.01) |
| *H01M 4/36* | (2006.01) |
| *H01M 4/505* | (2010.01) |
| *H01M 4/525* | (2010.01) |

(52) U.S. Cl.
CPC ........... *H01M 4/628* (2013.01); *H01M 4/131* (2013.01); *H01M 4/366* (2013.01); *H01M 4/505* (2013.01); *H01M 4/525* (2013.01)

(58) Field of Classification Search
CPC ...... H01M 4/628; H01M 4/131; H01M 4/366; H01M 4/505; H01M 4/525; H01M 4/1391; H01M 2004/028
See application file for complete search history.

(56) References Cited

U.S. PATENT DOCUMENTS

| | | | |
|---|---|---|---|
| 2017/0077489 A1* | 3/2017 | Uchiyama | C01G 53/50 |
| 2017/0162856 A1* | 6/2017 | Uchiyama | B05D 1/02 |
| 2019/0229333 A1* | 7/2019 | Aiki | H01M 4/36 |
| 2020/0075956 A1* | 3/2020 | Sugiura | C01G 33/00 |

OTHER PUBLICATIONS

K. Takada, "LiNbO3-coated LiCoO2 as cathode material for all solid-state lithium secondary batteries", Mar. 2007, Electrochem. Comm. vol. 9, p. 1486-p. 1490.

* cited by examiner

*Primary Examiner* — Milton I Cano
*Assistant Examiner* — Joshua P McClure
(74) *Attorney, Agent, or Firm* — MCDONNELL BOEHNEN HULBERT & BERGHOFF LLP

(57) ABSTRACT

The present disclosure relates to a method for producing a cathode material and a cathode including a cathode material produced thereby. More specifically, the present disclosure provides a production method which improves process efficiency while improving cathode performance in consideration of the practical use of an all-solid-state battery in the production of a cathode for the all-solid-state battery.

9 Claims, 2 Drawing Sheets

METHOD FOR PRODUCING CATHODE MATERIAL AND CATHODE INCLUDING CATHODE MATERIAL PRODUCED THEREBY

CROSS REFERENCE TO RELATED APPLICATIONS

This application claims under 35 U.S.C. § 119(a) the benefit of priority to Korean Patent Application No. 10-2020-0128223 filed on Oct. 5, 2020, the entire contents of which are incorporated herein by reference.

BACKGROUND

(a) Technical Field

The present disclosure relates to a method for producing a cathode material and a cathode including a cathode material produced thereby. More specifically, the present disclosure provides a production method which improves process efficiency while improving cathode performance in consideration of the practical use of an all-solid-state battery in the production of a cathode for the all-solid-state battery.

(b) Background Art

For use, a cathode material for an all-solid-state battery is subjected to a surface modification process of uniformly coating the surface of $Li(Ni/Co/Mn)O_2$ lithium oxide powder having a layered crystal structure with a lithium ion conductor such as $LiNbO_3$ or $Li_4Ti_5O_{12}$ to a thickness of several nanometers. In particular, the $LiNbO_3$ surface coating layer exhibits the effect of effectively improving battery capacity and output performance by significantly lowering lithium-ion transfer resistance through the "space charge layer mechanism", or maintaining battery life by suppressing a chemical reaction between dissimilar materials (i.e., oxide (cathode) and sulfide (electrolyte)) in a cathode composite layer (K. Takada, "$LiNbO_3$-coated $LiCoO_2$ as cathode material for all solid-state lithium secondary batteries"). However, current cathode surface coating technology has not only a problem in that the interface resistance between the cathode and the electrolyte accounts for more than 70% of the total resistance of the all-solid-state battery cell, but also a limitation in that the current "cathode surface coating" cost (coating material price/coating process cost) accounts for about 20 to 40% of the current price of the all-solid-state battery.

SUMMARY

An object of the present disclosure is to provide a method of replacing an organic solvent with a more economical solvent, the organic solvent being used in a surface modification process of coating the surfaces of conventional lithium oxide-based particles included in a cathode material with a lithium ion conductor.

Another object of the present disclosure is to improve the uniformity of a coating layer using a water-based solvent when coating the surfaces of lithium oxide-based particles with a lithium-ion conductor.

Objects of the present disclosure are not limited to the above-mentioned objects. Objects of the present disclosure will become more apparent from the following description, and will be realized by means described in the claims and combinations thereof.

The present disclosure provides a method for producing a cathode material, the method including steps of preparing a coating solution by adding, mixing and dissolving a coating material including lithium (Li) and niobium (Nb) in a solvent containing water ($H_2O$), forming a coating layer by spraying the coating solution onto the surfaces of lithium oxide-based particles; and heat-treating the coating layer.

The solvent may further contain an adjuvant, and the adjuvant may include at least one of ammonia ($NH_3$) and a surfactant.

The adjuvant may be contained in an amount of 0.001 to 0.30 parts by weight based on 100 parts by weight of the solvent.

The surfactant may include at least one of an anionic surfactant and a nonionic surfactant.

The coating solution may contain lithium at a concentration of 1 M to 10 M and niobium at a concentration of 1 M to 10 M.

The molar ratio between lithium and niobium contained in the coating solution may be Li/Nb=0.9 to 1.2.

The step of preparing the coating solution may include an addition step of adding the coating material to the solvent containing water, a dissolution step of dissolving the coating material in the solvent to obtain a solution, and a neutralization step of neutralizing the solution by adding hydroxide thereto.

Hydrogen peroxide ($H_2O_2$) together with the coating material may be added in the addition step to create a weakly acidic environment, ammonia ($NH_3$) may be added to the solvent in the dissolution step to create a strongly alkaline environment, and the coating material may be dissolved in the solvent in the strongly alkaline environment.

The coating material that is added may have a solubility that changes depending on the hydrogen ion concentration (pH) environment of the solvent, and the pH of the solvent may be adjusted using the hydrogen peroxide, ammonia and hydroxide that are added.

The pH in the addition step may be 3 or less, the pH in the dissolution step may be 3 to 12, and the pH in the neutralization step may be 6 to 8.

The coating solution in the step of forming the coating layer may be sprayed and attached onto the surfaces of the lithium oxide-based particles by a spray coating method.

The heat-treatment in the step of heat-treating the coating layer may be performed at a temperature of 300° C. to 450° C.

The present disclosure also provides a cathode including a cathode material produced by the above-described production method and including lithium oxide-based particles each having a coating layer formed on the surface thereof, and any one additive selected from among a solid electrolyte, a conductive material and a binder.

The coating layer included in the cathode material may have a thickness of 3 nm to 50 nm.

The cathode material may include lithium and at least two elements selected from among nickel (Ni), cobalt (Co), manganese (Mn), and aluminum (Al).

The present disclosure also provides an all-solid-state battery including the cathode, an anode including carbon, and a solid electrolyte interposed between the cathode and the anode.

BRIEF DESCRIPTION OF THE FIGURES

The above and other features of the present disclosure will now be described in detail with reference to certain exemplary examples thereof illustrated in the accompanying drawings which are given herein below by way of illustration only, and thus are not limitative of the present disclosure, and wherein.

DETAILED DESCRIPTION

Figure 1:
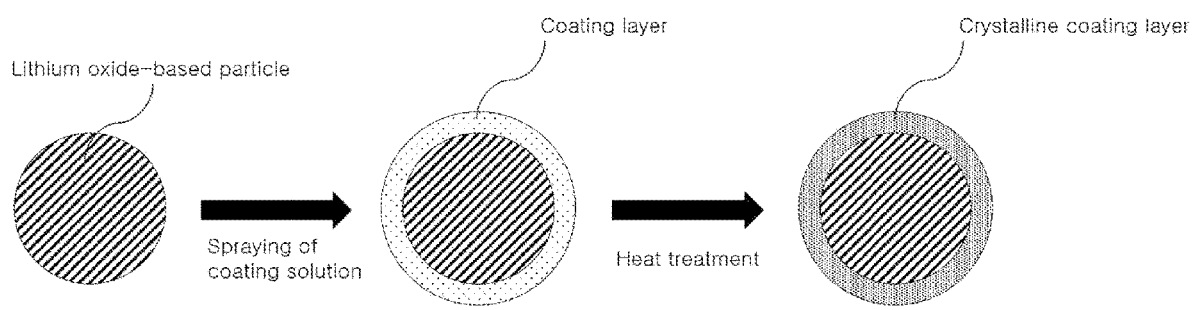
FIG. 1 schematically shows a process for producing a cathode material of the present disclosure.

The above objects, other objects, features and advantages of the present disclosure will become apparent with reference to embodiments described below in conjunction with the accompanying drawings. However, the present disclosure is not limited to the embodiments disclosed below and may be embodied in a variety of different forms. Rather, these embodiments disclosed herein are provided so that this disclosure will be thorough and complete, and will fully convey the spirit of the present disclosure to those skilled in the art.

Throughout the specification and the accompanying drawings, like reference numerals refer to like components. In the accompanying drawings, the dimensions of structures are exaggerated for clarity of illustration. Although terms such as "first" and "second" may be used to describe various components, the components should not be limited by these terms. These terms are used only to distinguish one component from another component. For example, a first component may be termed a second component without departing from the scope of the present disclosure, and similarly, a second component may also be termed a first component. Singular expressions include plural expressions unless the context clearly indicates otherwise.

In the present specification, it should be understood that terms such as "include" and "have" are intended to denote the existence of mentioned characteristics, numbers, steps, operations, components, parts, or combinations thereof described in the specification, but do not exclude the probability of existence or addition of one or more other characteristics, numbers, steps, operations, components, parts, or combinations thereof. In addition, when a part, such as a layer, film, region, plate, or the like, is referred to as being "on" or "above" another part, it not only refers to a case where the part is directly above the other part, but also a case where a third part exists therebetween. Conversely, when a part, such as a layer, film, region, plate, or the like, is referred to as being "below" another part, it not only refers to a case where the part is directly below the other part, but also a case where a third part exists therebetween.

Since all numbers, values and/or expressions referring to quantities of components, reaction conditions, polymer compositions, and mixtures used in the present specification are subject to various uncertainties of measurement encountered in obtaining such values, unless otherwise indicated, all are to be understood as modified in all instances by the term "about." Where a numerical range is disclosed herein, such a range is continuous, inclusive of both the minimum and maximum values of the range as well as every value between such minimum and maximum values, unless otherwise indicated. Still further, where such a range refers to integers, every integer between the minimum and maximum values of such a range is included, unless otherwise indicated.

In the present specification, where a range is stated for a parameter, it will be understood that the parameter includes all values within the stated range, inclusive of the stated endpoints of the range. For example, a range of 5 to 10 will be understood to include the values 5, 6, 7, 8, 9, and 10, as well as any sub-range such as 6 to 10, 7 to 10, 6 to 9, and 7 to 9, and also include any value and range between the integers which are reasonable in the context of the range stated, such as 5.5, 6.5, 7.5, 5.5 to 8.5 and 6.5 to 9. For example, a range of "10% to 30%" will be understood to include the values 10%, 11%, 12%, 13%, etc., and all integers up to and including 30%, as well as any sub-range such as 10% to 15%, 12% to 18%, 20% to 30%, etc., and also include any value between the integers which are reasonable in the context of the range stated, such as 10.5%, 15.5%, 25.5%, etc.

The present disclosure relates to a method for producing a cathode material and a cathode including a cathode material produced thereby. Hereinafter, a method for producing a cathode material according to the present disclosure will be described with reference to FIGS. 1 and 2, and a cathode including a cathode material produced by the production method will be described.

Method for Producing Cathode Material

The method for producing a cathode material according to the present disclosure includes steps of preparing a coating solution by adding, mixing and dissolving a coating material including lithium (Li) and niobium (Nb) in a solvent containing water ($H_2O$), forming a coating layer by spraying the coating solution onto the surfaces of lithium oxide-based particles, and heat-treating the coating layer.

Hereinafter, each step will be described with reference to FIGS. 1 and 2.

Step (S1) of Preparing Coating Solution

Figure 2:
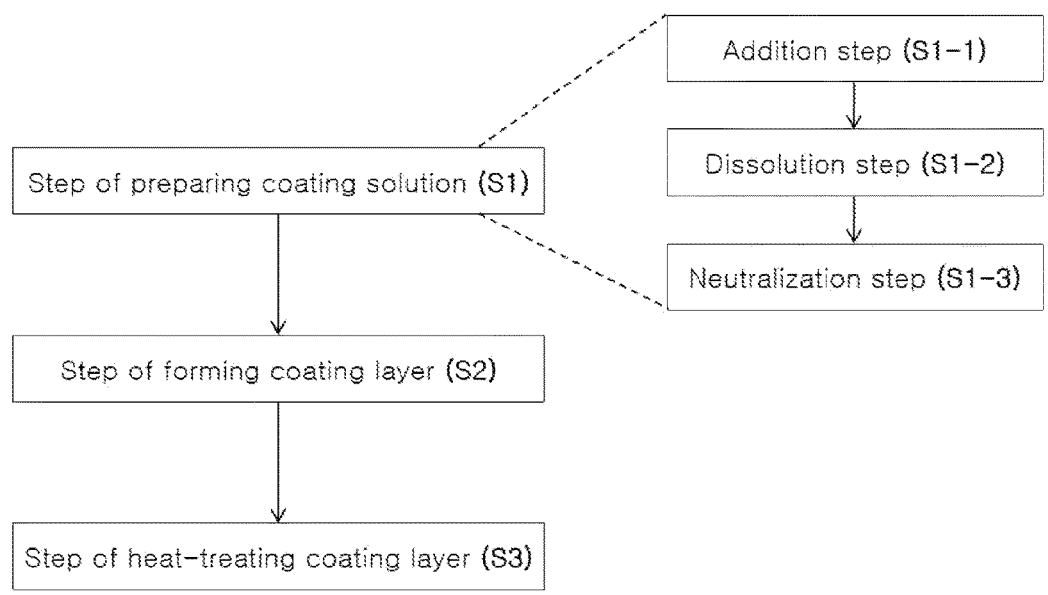
FIG. 2 shows a flow chart of a method for producing a cathode material according to the present disclosure.

Referring to FIG. 2, step S1 is a step of preparing a coating solution by adding, mixing and dissolving a coating material including lithium (Li) and niobium (Nb) in a solvent containing water ($H_2O$).

The solvent preferably contains only pure water ($H_2O$).

The present disclosure aims to reduce the process cost of an all-solid-state battery by using only water as a solvent for a coating solution. For this reason, the present disclosure ultimately aims to overcome problems occurring when water is used as a solvent, and as a result, provide a method for producing a cathode having excellent performance.

The coating material includes materials that lower the migration resistance of lithium ions. Specifically, the coating material includes lithium (Li) and niobium (Nb). Preferably, the coating material includes lithium hydroxide (LiOH) and niobic acid ($Nb_2O_2 \cdot 3H_2O$).

The coating material is well soluble in an organic solvent, but is not soluble in water. For this reason, the solvent may further contain an adjuvant for easy dissolution of the coating material.

The adjuvant includes at least one of ammonia ($NH_3$) and a surfactant, and preferably includes both ammonia and a surfactant. In this case, the adjuvant is preferably contained in an amount of 0.001 to 0.3 parts by weight, more preferably 0.01 to 0.1 parts by weight, based on 100 parts by weight of the solvent.

The surfactant is used to suppress a decrease in coating uniformity when coating the lithium oxide-based particles with the coating solution containing water as a solvent. Coating non-uniformity is a fundamental limitation occurring when water having a higher surface tension than an organic solvent such as ethanol is used as a solvent, and the present disclosure essentially introduces an optimal surfactant to overcome this limitation.

The surfactant preferably includes at least any one of an anionic surfactant and a nonionic surfactant. At this time, the surfactant preferably does not include a cationic surfactant. This is because the charge properties of the cationic surfactant may change depending on a hydrogen ion concentration (pH) environment, or the cationic surfactant may make it difficult to sensitively control the surface tension of the solvent. In particular, if the degree of change in the charge properties is great, the cationic surfactant may react with the material for modifying the surface properties of the cathode material or create residue. Thus, the type of surfactant needs to be selected in consideration of this fact.

The anionic surfactant may have an anionic group, such as a sulfate, sulfonate, phosphate or carboxylate group, included in the hydrophilic molecule ring thereof. Typically, examples of the sulfate include ammonium lauryl sulfate, sodium lauryl sulfate, alkyl polyoxyethylene sulfate, sodium alkylnaphthalene sulfate, and sodium alkyl ether sulfate, and examples of the phosphate include chlorinated phosphate, ethanolamine phosphate, chlorophosphate, and sphingomyelin.

The nonionic surfactant has a structure in which there is no charge in the hydrophilic ring thereof, and oxygen in the hydrophilic group is generally contained via a hydrogen bond. Typical examples of the nonionic surfactant include polysorbate-, sorbitan-, phenyl ether-, and polyethylene glycol-based surfactants. For example, the nonionic surfactant may be polyoxyethylene di-styrenated polyethylene, but is not limited thereto.

In the present disclosure, the nonionic surfactant is preferably used. This is because the change in the surface charge is minimized even when the surfactant is adsorbed on the surface of each of the lithium oxide-based particles or the coating layer. For this reason, side reactions due to diffusion of transition metals on the surface of the cathode material may be suppressed. In addition, even in the subsequent process of crystallizing lithium niobium oxide ($LiNbO_3$) dissolved in the coating solution and formed into the coating layer, the likelihood that atomic transformation will impede crystal growth may also decrease.

It is most preferable to use a phenyl ether-based nonionic surfactant as the surfactant.

The mixing is preferably performed at a temperature of 50° C. to 70° C. for 0.5 hours to 4 hours.

The step S1 of preparing the coating solution according to the present disclosure may be divided into: an addition step S1-1 of adding the coating material to the solvent containing water, a dissolution step S1-2 of dissolving the coating material in the solvent to obtain a solution, and a neutralization step S1-3 of neutralizing the solution by adding hydroxide thereto.

The hydrogen ion concentration of the solvent may change due to the effect of an adjuvant added or a reaction in each of the divided steps.

The present disclosure is characterized in that the hydrogen ion concentration is optimally controlled in each step, and parameters such as reaction time and reaction temperature are finely controlled.

Addition Step (S1-1)

The addition step is a step of adding the coating material to the solvent containing water The solvent may contain hydrogen peroxide ($H_2O_2$), and the solvent preferably has a weakly acidic environment. At this time, the hydrogen ion concentration (pH) of the solvent may be 3 or less.

The coating material includes lithium and niobium which are completely soluble in water. Preferably, the coating material includes lithium hydroxide and niobic acid. The solution prepared by dissolving the coating material added preferably contains lithium element and niobium element at molar concentrations of 0.05 M to 0.3 M, more preferably 0.1 M to 0.2 M, respectively. Here, the molar concentration refers to moles per liter of each element.

Dissolution Step (S1-2)

The dissolution step is a step of dissolving the coating material in the solvent to obtain a solution.

In the present disclosure, to facilitate the dissolution of the coating material in the solvent, a strongly alkaline environment is created by adding ammonia ($NH_3$). The reason why the environment of the solvent is adjusted to the strongly alkaline environment as described above is that the solvent of the present disclosure is substantially based on water, and it is difficult to dissolve the coating material including niobic acid in water without manipulation.

The pH of the solvent is preferably adjusted to 3 to 12, more preferably 8 to 11. When the pH of the solvent is adjusted to a strongly alkaline pH as described above, the coating material may be easily dissolved in the solvent.

However, even though the coating material is dissolved in the solvent, if fine control of the pH and the reaction temperature fails, a local reprecipitation reaction will occur and a niobium oxide ($Nb_2O_5$) precipitate will be generated.

The precipitate is a very stable material and can act as resistance at the interface between the cathode and the solid electrolyte. For this reason, the pH, reaction temperature and reaction time in each process step needs to be adjusted within preferable ranges.

Neutralization Step (S1-3)

The neutralization step is a step of neutralizing the solution by adding hydroxide thereto.

The pH of the solution is preferably adjusted to 6 to 8 by adding the hydroxide thereto. The hydroxide preferably includes lithium hydroxide. In this case, the hydroxide not only serves to slowly neutralize the solution so as for the pH of the solution not to change to acidic pH, but also provides a direct raw material for the coating layer to be formed later.

After the neutralization of the solution is completed, a coating solution in which the coating material is completely dissolved in the solvent may be obtained.

The coating solution may contain lithium at a concentration of 1 M to 10 M and niobium at a concentration of 1 M to 10 M.

The molar ratio between lithium and niobium contained in the coating solution is preferably Li/Nb=0.9 to 1.2. More preferably, the molar ratio is Li/Nb=1.0 to 1.1.

Step S2 of Forming Coating Layer

Step S2 is a step of forming a coating layer by spraying the coating solution onto the surfaces of lithium oxide-based particles.

The present disclosure is characterized in that spraying of the coating solution, formation of the coating layer, and drying of the coating layer are simultaneously performed. That is, in the step of forming the coating layer, a uniform coating layer may be formed through a thermal hydrolysis reaction, only when the solvent is volatilized by rapid drying simultaneously with spraying of the coating solution and formation of the coating layer.

Referring to FIG. 1, it can be seen that the coating layer is formed on the surface of each lithium oxide-based particle.

Examples of the lithium oxide-based particles include, but are not limited to, lithium nickel cobalt manganese oxide, lithium nickel cobalt aluminum oxide, lithium cobalt oxide, and lithium manganese oxide, and it is possible to use any lithium oxide-based material which is applied to a cathode in the all-solid-state battery field.

The coating solution is preferably sprayed and attached onto the surfaces of the lithium oxide-based particles by a spray coating method in which spraying, coating and drying of the coating solution are simultaneously performed.

In the present disclosure, the step of forming the coating layer, in which coating and drying are performed, is preferably performed at a temperature of 60° C. to 150° C. and an air flow rate of 0.20 m$^3$/min to 0.60 m$^3$/min. In addition, the spraying is preferably performed at a rate of 2 g/min to 20 g/min. This spraying rate is a value determined in consideration of the properties of water having a specific gravity of 1.0 g/cm$^3$, a boiling point of 100° C., and a latent heat of vaporization of 500 cal/g or more, and may be changed according to the type of process.

Heat-Treatment Step S3

Step S3 is a step of obtaining a crystalline coating layer by crystallizing the coating layer as shown in FIG. 1 through heat treatment of the coating layer formed on the surfaces of the lithium oxide-based particles.

The heat treatment is preferably performed at a temperature of 300° C. to 450° C.

Cathode Material

The present disclosure provides a cathode material produced by the above-described production method.

The cathode material is characterized by having a core-shell structure including the lithium oxide-based particle as a core and the coating layer as a shell. At this time, the thickness of the coating layer included in the cathode material is preferably 5 nm to 50 nm.

The cathode material of the present disclosure is characterized by including lithium and at least two elements selected from among nickel (Ni), cobalt (Co), manganese (Mn), and aluminum (Al).

Cathode

A cathode of the present disclosure includes the cathode material of the present disclosure and an additive.

The additive may include at least one of a solid electrolyte, a conductive material, and a binder, but is not limited thereto.

All-Solid-State Battery

An all-solid-state battery of the present disclosure is characterized by including the cathode, an anode including carbon, and a solid electrolyte interposed between the cathode and the anode.

In the present disclosure, the solid electrolyte is not particularly limited in the kind thereof, and may be any material that is commonly used in the all-solid-state battery field.

The anode may further include at least one of a solid electrolyte, a conductive material, and a binder, but is not limited thereto.

Hereinafter, the present disclosure will be described in more detail with reference to specific examples. However, these examples serve to illustrate the present disclosure, and the scope of the present disclosure is not limited thereby.

Example 1

40 parts by weight of niobic acid was added to 100 parts by weight of water containing hydrogen peroxide to form a solution, and the pH of the solution was adjusted to 10 by adding and mixing ammonia thereto. Next, the solution was neutralized by adding lithium hydroxide thereto. After completion of the neutralization, a coating solution containing lithium and niobium at a molar ratio of 1:1 was obtained.

The obtained coating solution was sprayed into a rotary fluidized-bed spray coater (Powrex MP-01) containing lithium oxide-based particles. At this time, the coating solution was sprayed at a rate of 4 g/min to a thickness of 5 nm while the lithium oxide-based particles were circulated at a temperature of 140° C. and an air flow rate of 0.40 m$^3$/min.

Figure 3:
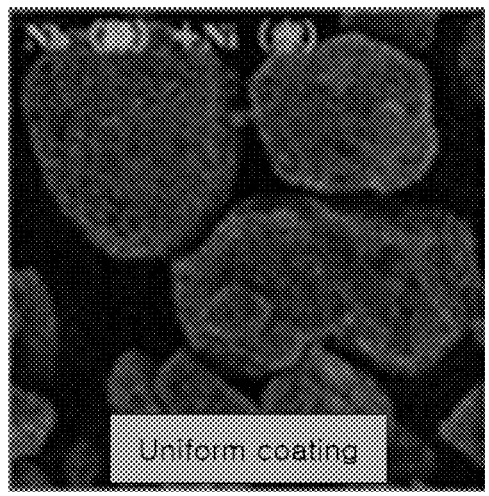
FIG. 3 is an auger electron spectroscopy (AES) image of the surface of a cathode material produced in Example 1.

Thereafter, the coated cathode material was heat-treated at a temperature of 350° C. to crystallize the coating layer, and the cathode material including the coating layer was added to a solvent together with a conductive material and a binder and mixed, thus producing a thin cathode film having a loading amount of about 15 mg/cm$^2$. At this time, the cathode material having the coating layer formed thereon was observed by auger electron spectroscopy (AES), and as a result, it could be confirmed that a uniform coating was achieved as shown in FIG. 3.

In addition, an anode was fabricated by adding and mixing a graphite active material, a solid electrolyte and a binder in a solvent, followed by coating. Thereafter, the anode and the cathode were punched in the form of a disk having a diameter of 13 mm, and solid electrolyte powder was added between the electrodes to assemble an all-solid-state battery test cell.

Example 2

Production of a cathode material and assembly of an all-solid-state battery test cell were performed in the same manner as in Example 1, except that 0.125 parts by weight of a nonionic surfactant (polyoxyethylene di-styrenated polyethylene) was additionally added to 100 parts by weight of the water of Example 1 together with niobic acid and ammonia.

Example 3

Production of a cathode material and assembly of an all-solid-state battery test cell were performed in the same manner as in Example 1, except that 0.125 parts by weight of a nonionic surfactant (polyoxyethylene alkyl ether-based) was additionally added to 100 parts by weight of the water of Example 1 together with niobic acid and ammonia.

Example 4

Production of a cathode material and assembly of an all-solid-state battery test cell were performed in the same manner as in Example 1, except that 0.125 parts by weight of an anionic surfactant (sodium alkyl naphthalene sulfate) was additionally added to 100 parts by weight of the water of Example 1 together with niobic acid and ammonia.

Example 5

Production of a cathode material and assembly of an all-solid-state battery test cell were performed in the same manner as in Example 1, except that 0.125 parts by weight of an anionic surfactant (alkyl polyoxyethylene sulfate) was additionally added to 100 parts by weight of the water of Example 1 together with niobic acid and ammonia.

Comparative Example 1

Assembly of an all-solid-state battery test cell was performed in the same manner as in Example 1, except that lithium oxide-based particles were not coated with a separate coating solution.

Comparative Example 2

Assembly of an all-solid-state battery test cell was performed in the same manner as in Example 1, except that ethanol was used instead of water as a solvent.

Comparative Example 3

Production of a cathode material and assembly of an all-solid-state battery test cell were performed in the same manner as in Example 1, except that 0.125 parts by weight of a cationic surfactant (alkylbenzylmethylammonium salt) was additionally added to 100 parts by weight of the water of Example 1 together with niobic acid and ammonia.

Comparative Example 4

Production of a cathode material and assembly of an all-solid-state battery test cell were performed in the same manner as in Example 1, except that 0.125 parts by weight of an amphoteric surfactant (alkyl carboxybetaine) was additionally added to 100 parts by weight of the water of Example 1 together with niobic acid and ammonia.

Test Example (DC-IR)

The discharge capacity and DC-IR values of the all-solid-state battery test cells of Examples 1 to 5 and Comparative Examples 1 to 4 were measured, and the results of the measurement are shown in Table 1 below.

TABLE 1

|  | Discharge capacity (mAh/g) | DC-IR (Ω) |
| --- | --- | --- |
| Example 1 | 162.4 | 37.9 |
| Example 2 | 168.9 | 33.5 |
| Example 3 | 163.6 | 50.7 |
| Example 4 | 162.9 | 51.3 |
| Example 5 | 161.6 | 51.4 |
| Comparative Example 1 | 128.9 | 349.4 |
| Comparative Example 2 | 159.8 | 33.5 |
| Comparative Example 3 | 155.8 | 62.1 |
| Comparative Example 4 | 157.7 | 54.2 |

Test conditions: test voltage of 2.5 V to 4.3 V; test current of 0.1 C; constant current/constant voltage (CC/CV)

From the results in Table 1 above, it can be seen that Example 1 in which water was used as the solvent had a higher discharge capacity than Comparative Example 2 in which ethanol was used as the solvent.

In addition, it can be seen that the all-solid-state battery test cell (Comparative Example 1) produced using, as the cathode material, the lithium oxide-based particles to which the coating solution of the present disclosure was not applied, had a low discharge capacity and a very high resistance value.

In addition, it can be seen that the all-solid-state battery test cell obtained using the coating solution containing the anionic surfactant or the nonionic surfactant had a higher discharge capacity and a lower resistance value than the all-solid-state battery test cells obtained using the coating solutions containing other surfactants. In particular, it can be confirmed that the all-solid-state battery test cell obtained using the coating solution containing the nonionic surfactant showed the lowest resistance value.

As described above, according to the present disclosure, it is possible to provide a method of replacing an organic solvent with a more economical solvent, the organic solvent being used in a surface modification process of coating the surfaces of conventional lithium oxide-based particles included in a cathode material with a lithium ion conductor.

According to the present disclosure, it is possible to improve the uniformity of a coating layer using a water-based solvent when coating the surfaces of lithium oxide-based particles with a lithium-ion conductor.

The effects of the present disclosure are not limited to the above-mentioned effects. It is to be understood that the effects of the present disclosure include all effects that may be deduced from the above description.

The invention claimed is:

1. A method for producing a cathode material, the method comprising steps of:
preparing a coating solution by adding, mixing, and dissolving a coating material comprising lithium (Li) and niobium (Nb) in a solvent containing water ($H2O$);
forming a coating layer by spraying the coating solution onto surfaces of lithium oxide-based particles; and
heat-treating the coating layer;
wherein preparing the coating solution comprises:
an addition step of adding the coating material to the solvent containing water;
a dissolution step of dissolving the coating material in the solvent to obtain a solution; and
a neutralization step of neutralizing the solution by adding hydroxide thereto;
wherein the solvent further contains an adjuvant, and the adjuvant comprises a surfactant;
wherein the surfactant comprises at least one of an anionic surfactant and a nonionic surfactant; and
wherein the adjuvant is contained in an amount of 0.001 to 0.30 parts by weight based on 100 parts by weight of the solvent.

2. The method of claim 1, wherein the coating solution contains lithium at a concentration of 1 M to 10 M and niobium at a concentration of 1 M to 10 M.

3. The method of claim 1, wherein a molar ratio between lithium and niobium contained in the coating solution is Li/Nb=0.9 to 1.2.

4. The method of claim 1, wherein the coating solution in the step of forming the coating layer is sprayed and attached onto the surfaces of the lithium oxide-based particles by a spray coating method.

5. The method of claim 1, wherein the heat-treatment in the step of heat-treating the coating layer is performed at a temperature of 300° C. to 450° C.

6. The method of claim 1, wherein the pH in the addition step is 3 or less, the pH in the dissolution step is 3 to 12, and the pH in the neutralization step is 6 to 8.

7. The method of claim 1, wherein the adjuvant further comprises ammonia ($NH3$).

8. The method of claim 7, wherein hydrogen peroxide ($H2O2$) together with the coating material is added in the addition step to create a weakly acidic environment, ammonia ($NH3$) is added to the solvent in the dissolution step to create a strongly alkaline environment, and the coating material is dissolved in the solvent in the strongly alkaline environment.

9. The method of claim 8, wherein the coating material that is added has a solubility that changes depending on a hydrogen ion concentration (pH) environment of the solvent, and the pH of the solvent is adjusted using the hydrogen peroxide, ammonia and hydroxide that are added.

* * * * *